United States Patent

[11] 3,607,177

[72] Inventors Albert Sidney Robinson
Birkdale, Southport;
David Gordon Loukes, Eccleston Park, Prescot; Jack Lawrenson, Windle, St. Helens, all of England
[21] Appl. No. 733,109
[22] Filed May 29, 1968
[45] Patented Sept. 21, 1971
[73] Assignee Pilkington Brothers Limited
Liverpool, Lancashire, England
[32] Priority June 19, 1967
[33] Great Britain
[31] 28273/67

[54] PROCESS AND APPARATUS FOR SURFACE MODIFICATION OF GLASS
17 Claims, 12 Drawing Figs.
[52] U.S. Cl. .................................................. 65/30, 65/99, 65/182, 117/124
[51] Int. Cl. ............................................................. C03c 21/00
[50] Field of Search ............................................. 65/30, 114, 99 A, 182; 117/124; 204/1

[56] References Cited
UNITED STATES PATENTS

| | | | |
|---|---|---|---|
| 3,199,966 | 8/1965 | O'Connell et al. | 65/182 X |
| 3,351,451 | 11/1967 | Barradell-Smith et al. | 65/99 A X |
| 3,467,508 | 9/1969 | Loukes et al. | 65/30 |
| 3,477,834 | 11/1969 | Morris | 65/30 |
| 3,486,995 | 12/1969 | Evers | 65/30 X |
| 3,505,049 | 4/1970 | Plumat | 65/30 |

*Primary Examiner*—S. Leon Bashore
*Assistant Examiner*—John H. Harman
*Attorney*—Morrison, Kennedy & Campbell

ABSTRACT: A body of molten electrically conductive material is maintained against hot glass by causing the molten body to cling to a locating member adjacent the glass, and electric current is passed between the molten body and the glass to cause controlled migration of an element from the molten body into the glass surface.

PATENTED SEP 21 1971 3,607,177

Inventors
Albert Sidney Robinson
David Jordan Loughran
Jack Lawrenson
By
Morrison, Kennedy & Campbell
Attorneys

PROCESS AND APPARATUS FOR SURFACE MODIFICATION OF GLASS

BACKGROUND OF THE INVENTION

This invention relates to the production of glass having predetermined surface characteristics.

It is a main object of the present invention to provide an improved method and apparatus for use in the production of glass to impart desired surface characteristics to the glass, for example, particular characteristics of reflectivity, color or electrical conductivity

SUMMARY

According to the invention a method of producing glass having predetermined surface characteristics is characterized by regulating the temperature of the glass so that it is electrically conductive, maintaining a body of molten electrically conductive material against the glass by causing said molten body to cling to a locating member adjacent the glass, passing electric current between the molten body of electrically conductive material and the glass and regulating the electric current to cause controlled migration of an element from said molten material into the surface of the glass, thereby effecting a predetermined change in the surface characteristics of the glass.

The method of the invention is especially applicable to the production of flat glass having predetermined surface characteristics, and from this aspect comprises continuously forming a ribbon of glass and advancing the ribbon at a controlled rate, maintaining a body of molten electrically conductive material against a face of the ribbon of glass while it is still hot by causing that molten body to cling to a locating member adjacent that face, passing electric current between the molten body of electrically conductive material and the glass, and regulating the electric current to cause controlled migration of an element from the molten material into said face of the glass, thereby effecting a predetermined change in the surface characteristics of the glass.

A desired concentration of the element which is to migrate into the glass may be maintained in the body of electrically conductive material by continuously introducing that element into the body of molten electrically conductive material, and controlling the introduction in relation to the rate of advance of the glass and the strength of the electric current which is passing between the molten body and the glass.

The invention may be applied to glass articles, e.g. sheets of glass which are supported on a roller conveyor. Further the invention may be applied to a continuous ribbon of glass which is being advance on a roller conveyor.

Additionally the invention may be applied to the well-known float process of making flat glass in which a ribbon of glass is produced on the surface of a support, constituted by a bath of molten metal, from molten glass supplied to the surface at one end of the bath, usually referred to as the hot end of the bath, to establish a layer of molten glass on the bath; the glass in the layer being advanced partly by momentum and partly by a traction effort directed longitudinally of the ribbon developed from the layer so that the molten glass fed to the bath is converted into continuous ribbon form and is advanced under conditions such that it can be removed from the bath without harm to the glass.

From this latter aspect a method of producing float glass having desired surface characteristics during which glass is advanced along a bath of molten metal and the temperature of the glass is regulated to control the electrical conductivity of the glass, is characterized by maintaining a body of molten electrically conductive material against the upper face of the glass by causing said molten body to cling to a locating member mounted above and adjacent the upper face of the advancing ribbon of glass, and modifying the glass surface by passing a controlled electric current through the glass between the body of molten material and the bath of molten metal.

In a preferred method according to the invention the surface constitution of the upper face of the glass is altered by maintaining an elongated body of molten electrically conductive material against the upper face of the advancing ribbon of glass by causing that elongated body to cling to a locating member extending transversely of the advancing ribbon of glass, and passing said controlled electric current between the elongated body and the bath of molten metal in such a sense that the elongated body of molten material effectively acts as an anode.

The forces which act to suspend the molten material against the upper face of the advancing ribbon of glass are engendered by the molten material clinging to the locating member supported over the path of travel of the ribbon of glass, and electric current flows between the suspended molten material and the bath of molten metal, the path taken by the current being from the body of molten material and through the thickness of the glass into the bath of molten metal.

The molten electrically conductive material may be a molten metal or a molten alloy. Alternatively a molten salt may be used. The fact that the molten material is clinging to the locating member which locates the molten material on the upper surface of the ribbon of glass means that the weight of the body of molten material is not wholly supported by the glass and the method of the present invention can even be carried out on glass which is in a plastic state or a molten state.

Stiffened glass can be treated according to the invention, either as glass articles, e.g. in sheet form or as glass in stiffened ribbon form as long as the temperature of the glass is such that the glass has a sufficient electrical conductivity to permit current flow into the glass from the modifying material so that the desired migration of modifying material from the molten electrically conductive material into the surface of the glass against which that material is supported can be regulated.

A defined region only of the upper face of an advancing ribbon of glass may be modified by the method of the invention for example in order to produce in the surface of the glass a pattern of stripes as the ribbon of glass is advanced with the molten electrically conductive material contracting its upper face. More usually the whole of one or both faces of the advancing ribbon of glass is/are modified.

The electric current may be a direct current in which case there is preferential treatment of the upper of lower face of the glass to modify its characteristics.

Alternatively alternating current may be employed to change simultaneously the surface characteristics of both faces of the glass. The characteristics of the lower face of the glass are being modified in such cases by electrical action at the interface between the glass and the bath of molten along which the ribbon of glass is being advanced.

The body of molten material may be constituted by a molten metal which is a member of the group consisting of tin, lead, bismuth, antimony, indium, zinc and thallium.

Other metals may be employed in the method of the invention, but some metals which are required to be introduced into the surface of the glass are not molten at the usual glass-working temperatures, and other modifying metals which are highly reactive for example, lithium sodium and potassium have to be used in diluted form, and the invention also includes employing a molten alloy as the molten electrically conductive material. The solute metal in the alloy enters the surface of the glass under the action of the electric current.

The molten alloy may be an alloy of tin as solvent metal with a solute metal which is a member of the group consisting of lithium, sodium, potassium, zinc, magnesium, aluminum, silicon, titanium, manganese, chromium, iron and vanadium.

Further according to the invention the molten alloy may be an alloy of bismuth as solvent metal with a solute metal which is a member of the group consisting of lithium, sodium, zinc, magnesium, aluminum, silicon, titanium, manganese, cobalt, nickel, copper, silver gold, antimony, indium and rhenium.

Still further according to the invention the molten alloy may be an alloy of lead as solvent metal with a solute metal which is a member of the group consisting of lithium, sodium, zinc, magnesium, aluminum, silicon, titanium, manganese, chromium, cobalt, nickel, copper, silver, antimony, indium and rhenium.

The temperature of the alloy and the electric current may be selectively regulated to cause migration of two metals from the alloy into the glass in a proportion to produce desired characteristics in the glass.

The locating member to which the body of molten electrically conductive material clings need not itself be an electrical conductor. Connection may be made directly to the molten material by means of a probe fixed to the locating member. It is preferred however that the body of molten material shall cling to a metal-locating member by means of which electrical connection is made to the molten material.

The metal of the locating member may be a member of the group consisting of osmium, palladium, platinum, rhodium, ruthenium, iridium and rhenium.

With an electrode constituted by one of these metals there is usually no tendency for the metal of the electrode to enter the surface of the glass.

The electrode need not be fully constituted by the inactive metal, but may be an electrode of a common metal which is plated with a more expensive metal such as ruthenium. For example the ruthenium may be plated onto copper or brass or even onto a graphite electrode.

Further according to the invention the electrode may be an alloy which is solid at the temperature of operation, or may be made from composite material, for example a composite made up from a refractory material such as alumina with a proportion of electrode metal, for example ruthenium.

In a preferred method of operating the invention lead is employed as the molten electrically conductive material and the electrode is a ruthenium electrode. Lead enters the upper surface of the ribbon of glass and imparts a grey color to the glass which has been found to produce a most effective "antiglare" glass. The protective atmosphere maintained in the headspace over the bath of molten metal along which the ribbon of glass is being advanced contains a reducing agent, for example hydrogen, and the exposure of the lead-containing upper surface of the glass to the hydrogen in the atmosphere enhances the presence of lead in metallic form in the skin of the upper surface of the glass.

Because the weight of the molten lead is borne partially by the ruthenium electrode to which the body of molten lead clings the method can be carried out near the hot end of the tank structure containing the bath of molten metal along which the glass is being advanced, for example where the temperature is in the region of 900° C., and during the further travel along the bath of the ribbon of glass which has had its upper face modified by the entry of lead into that face, reduction of lead in the surface is continued by the action of the protective atmosphere to which the lead-containing surface skin is exposed.

The metal constituting the electrode or comprised in the electrode is not necessarily the same as the metal entering the surface of the glass from the body of molten material. It has been found that the platinum group metals set out above can be employed as the electrode with any molten alloy or molten metal used in the method of the invention.

If the metal of the locating member which is acting as an anode is the same as a metal which is to migrate from the body of a molten alloy into the upper face of the glass then the concentration of that metal in the alloy is continuously replenished from the metal of the electrode.

From this aspect of the invention the solute metal of the tin alloy may be a member of the group consisting of silicon, titanium, manganese, chromium, iron and vanadium and the locating member is made of the selected solute metal.

Further according to the invention the solute metal of the bismuth alloy may be a member of the group consisting of silicon, titanium, manganese, cobalt, nickel, copper, silver, gold, and rhenium, and the locating member is made of the selected solute metal.

Still further according to the invention the solute metal of the lead alloy may be a member of the group consisting of silicon, titanium, manganese, chromium, cobalt, nickel, copper, silver, and rhenium, and the locating member is made of the selected solute metal.

Further the molten electrically conductive material may be a molten halide of an element selected from the group consisting of halides of silver, copper, zinc, sodium, potassium, lithium, chromium, manganese, cerium, cobalt, neodymium and praeseodymium. A mixture of such halides which is molten at the temperature of the glass may be used.

The electric current which is causing the modification of the surface of the ribbon of glass may pass through the glass to an electrical connection with the underface of the glass constituted, for example, by the bath of molten metal supporting the ribbon of glass. In another way of carrying out the invention a ribbon of glass is continuously formed and advanced at a controlled rate, two bodies of molten electrically conductive material, which may be dissimilar bodies, are maintained against the glass surface by causing the molten bodies to cling to locating members adjacent the glass, and controlled electric current is passed through the glass between said bodies to modify the surface constitution of the glass.

For example if the glass is being advanced on a roller conveyor one of the bodies of molten electrically conductive material may be maintained in contact with the underface of the glass between the conveyor rollers while the other body is suspended against the upper face of the glass so that the electric current flows through the thickness of the glass.

In another embodiment of the invention the two bodies are suspended against the upper face of the advancing glass and are spaced apart by a distance sufficient to ensure that the electric current passes across both interfaces between the bodies of molten material and the glass, and not merely along that face of the glass. Current flow between the bodies may take place just beneath the contacted surface of the glass.

As well as sheets of glass, other glass articles may be produced with desired surface characteristics by the method of the invention, for example hollow glass blocks, television tube face plates, electrical insulators and other articles of pressed ware. Accordingly the invention also provides a method of producing a glass article having predetermined surface characteristics other than the natural characteristics inherent in the method of forming the article, characterized in that when the article is sufficiently hot to be electrically conductive, a body of molten electrically conductive material clinging to a locating member is held against one face of the article, said body containing an element capable of producing the desired surface characteristic when incorporated in the article, an electric current is passed through the article between said body and an electrically conductive body contacting the other face of the article to cause migration of said element into the article, and said electric current is regulated whereby the concentration of said element incorporated in the article is adjusted to produce the desired characteristic.

The invention also comprehends apparatus for use in the production of flat glass having desired surface characteristics, comprising a support for the flat glass, heaters associated with the support for controlling the electrical conductivity of the glass, an elongated locating member mounted transversely of the glass so as to be adjacent one face of the glass so as to maintain against that face of the glass a body of molten electrically conductive material which clings to the locating member, and electric current supply means including a current supply circuit and means for making electrical connection with the body of molten electrically conductive material, and means for making electrical connection with the other face of the glass and positioned so as to permit current flow between the body of molten electrically conductive material and the glass.

In a preferred apparatus according to the invention glass in ribbon form is advanced along a bath of molten metal and the apparatus comprises a tank structure containing a bath of molten metal, a roof structure defining a headpiece over the bath, means for maintaining a plenum of protective atmosphere in the headspace, means for delivering glass at a controlled rate to the bath and for advancing the glass along the bath as a layer of molten glass in ribbon form, an electrically conductive locating member mounted transversely of and just above the path of travel of the glass, means for maintaining a body of molten electrically conductive material clinging by surface tension forces to said locating member and suspended against a face of the glass, an electrical connection to the bath of molten metal, and a regulatable current supply circuit connected to the locating member and, through said electrical connection, to the bath of molten metal.

Preferably the locating member is a bar-shaped electrode mounted transversely of the path of travel of the glass.

The bar-shaped electrode may be made from a metal which is not active in the electrical transfer of an element into the glass and from this aspect of the invention the electrode is made from a metal which is a member of the group consisting of platinum, palladium, ruthenium, rhodium, osmium, iridium and rhenium.

Alternatively the electrode may be of a metal which is to migrate into the surface of the glass under the action of the applied electric current, and may be made from a metal which is a member of the group consisting of silicon, titanium, manganese, chromium, iron, vanadium, cobalt, nickel, copper, silver, gold, and antimony.

In another embodiment of the invention the electrically conductive locating member may be a strip of metal foil which is anchored at its ends to the tank structure so that the faces of the foil lie parallel to and just above the path of travel of the ribbon of glass.

Further according to the invention the electrode may be formed with an aperture extending downwardly through the electrode, and a bar of a metal to be introduced into the glass is fitted into the aperture and is connected to means for gradually lowering the bar through the aperture so that it maintains the concentration of that metal in the body of molten electrically conductive material clinging to the electrode.

In yet another embodiment of the invention the locating member is an elongated rectangular receptacle of porous refractory material for containing a quantity of molten salt which percolates through the container to replenish a body of molten salt clinging to the bottom of the container, and electrical connection means make electrical connection with the salt in the container.

The invention also comprehends glass having desired surface characteristics imparted to the glass by a surface stratum comprising at least one element introduced into the glass by a method as hereinbefore described.

BRIEF DESCRIPTION OF THE DRAWINGS

In the drawings like references indicate the same or similar parts.

DESCRIPTION OF THE PREFERRED EMBODIMENT

Figure 1:
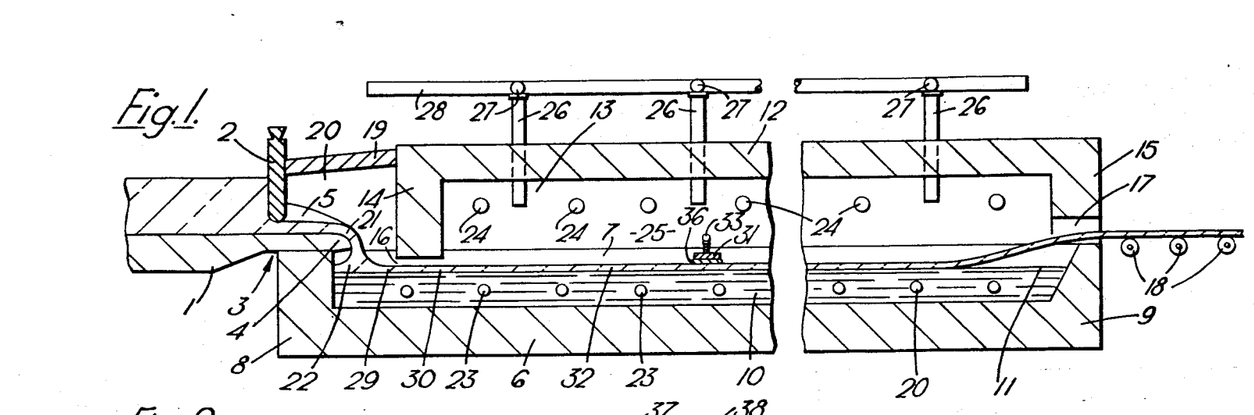
FIG. 1 is a sectional elevation of apparatus according to the invention, including a tank structure containing a bath of molten metal, a roof structure over the tank structure, apparatus for pouring molten glass onto the bath, and an electrode mounted above the bath to which a body of molten electrically conductive material clings.
Figure 2:
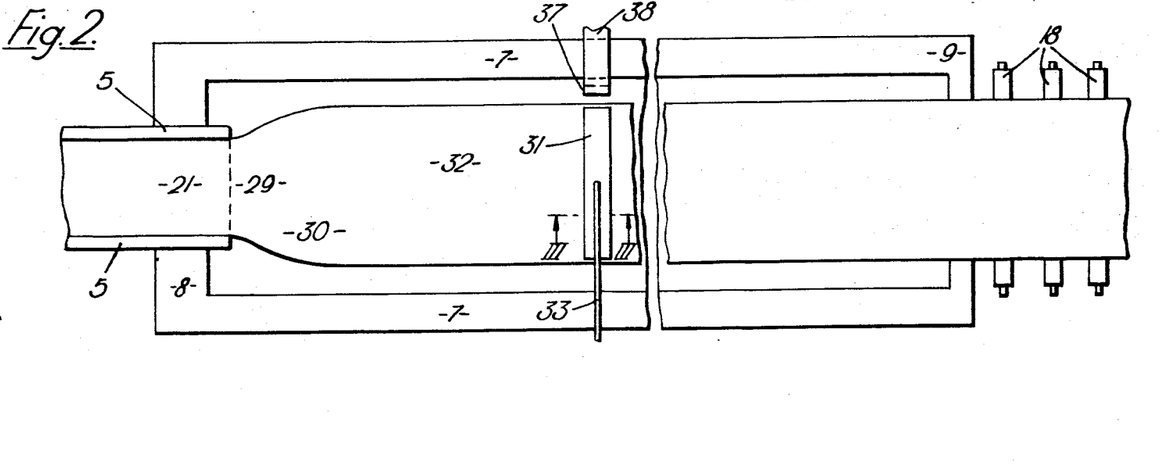
FIG. 2 is a plan view of the apparatus of FIG. 1, but with the roof structure removed.

Referring to FIGS. 1 and 2 of the drawings a forehearth of a continuous glass melting furnace is indicated at 1 and a regulating tweel at 2. The forehearth ends in a spout 3 comprising a lip 4 and side jambs 5 one of which is shown in FIG. 1. The lip 4 and side jambs 5 together constitute a spout of generally rectangular cross section.

The spout 3 is disposed above the floor 6 of an elongated tank structure including sidewalls 7 joined together to form an integral structure with the floor 6, an end wall 8 at the inlet end of the tank and an end wall 9 at the outlet end of the tank. The tank structure holds a bath of molten metal 10 whose surface level is indicated at 11. The bath is for example a bath of molten tin or of a molten tin alloy in which tin predominates and which as a specific gravity greater than that of the glass.

A roof structure is supported over the tank structure and the roof structure includes a roof 12, sidewalls 13 and integral end walls 14 and 15 respectively at the inlet and outlet ends of the bath. The inlet end wall 14 extends downwardly close to the surface 11 of the molten metal to define with that surface an inlet 16 which is restricted in height and through which molten glass is advanced as will be described below.

The outlet end wall 5 of the roof structure defines with the outlet end wall 9 of the tank structure an outlet 17 through which the ultimate ribbon of glass produced on the bath is discharged onto driven conveyor rollers 18 mounted outside the outlet end of the tank structure and disposed somewhat above the level of the top of the end wall 9 of the tank structure so that the ribbon is lifted clear of the wall 9 for discharge through the outlet 17.

The rollers 18 convey the ultimate ribbon of glass to an annealing lehr in well-known manner and also apply tractive effort to the ribbon of glass to assist in advancing the ribbon as it glides along the surface of the bath 10.

An extension 19 of the roof structure extends up to the tweel 2 and forms a chamber having sidewalls 20 in which the spout 3 is disposed.

Molten soda-lime-silica glass 21 is poured onto the bath 10 of molten metal from the spout 3 and the tweel 2 regulates the rate of flow of the molten glass 21 over the spout lip 4. This lip is vertically spaced from the surface 11 of the bath so that there is a free fall of the molten glass 21 through a distance of a few inches, which is exaggerated in FIG. 1, to the level of the bath surface 11. This free fall is such as to ensure the formation of a heel 22 of molten glass behind the glass 21 pouring over the spout, which heel extends back to the inlet end wall 8 of the tank structure.

The temperature of the glass as it is advanced along the bath is regulated from the inlet end down to the discharge end by temperature regulators 23 immersed in the bath 10 and temperature regulators 24 mounted in the headspace 25 defined by the roof structure over the bath. A protective gas is supplied to the headspace through ducts 26 which are provided at intervals in the roof 12. The ducts 26 are connected by branches 27 to a header 28 which is connected to a supply of protective gas and preferably the protective gas contains a reducing constituent for example a proportion of hydrogen.

Thus a plenum of protective gas is maintained in the substantially closed headspace, and there is outward flow of protective gas through the inlet 16 and the outlet 17 from the headspace.

The temperature of the molten glass delivered to the bath is regulated by the temperature regulators 23 and 24 as the glass is advanced along the bath so as to ensure that a layer of molten glass 29 is established on the bath. This layer 29 is advanced through the inlet 16 and during this advance there is unhindered lateral flow of the molten glass under the influence of surface tension and gravity to the limit of free flow of the molten glass, until there is developed on the bath surface from the layer 29 a buoyant body 30 of molten glass which is then advanced in ribbon form along the bath. The width of the tank structure at the surface level of the bath is greater than the width of the buoyant body 30 of molten glass so that there is no limitation to the initial free lateral flow of the molten glass.

In order to impart desired surface characteristics to the upper face of the ribbon of glass by the method according to the invention, a molten electrically conductive material is maintained by surface tension forces against that face of the glass and the glass is moved beneath the electrically conductive material.

As shown in FIGS. 1 to 4 a bar-shaped electrode 31 is mounted transversely of the ribbon of glass 32 which is being advanced along the bath of molten metal. The bar-shaped electrode 31 is mounted just above the upper face of the glass so that a gap, for example of about 6 mm. is left between the bottom of the electrode and the path of travel of the upper face of the glass. The electrode 31 is maintained in position by a connection rod 33 which extends into the headspace over the bath through the sidewall of the tank and is connected to the center of the electrode. Electrical insulating means (not shown) may also be provided for assisting in locating the electrode 31 accurately adjacent to the upper face of the glass.

Figure 4:
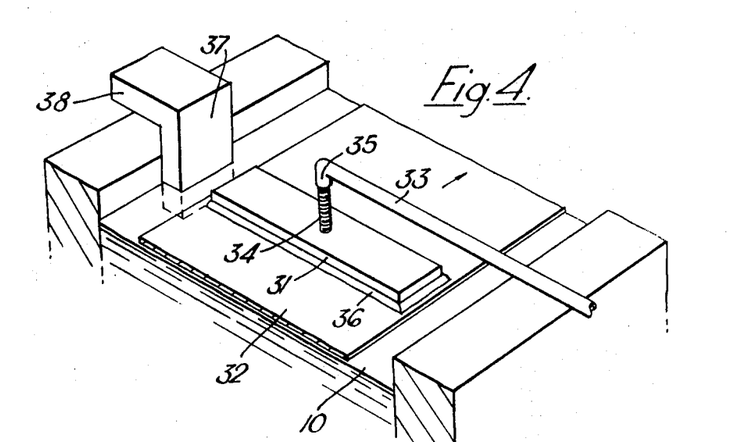
FIG. 4 is a perspective view of a bar-shaped electrode according to the invention mounted above the path of travel of a ribbon of glass along a bath of molten metal and showing the electrical connection to the bath of molten metal.

The rod 33 as well as serving for mounting the bar-shaped electrode 31 over the upper surface of the glass is also an electrical conductor enabling electrical connection of a supply circuit to the electrode 31. As shown in FIG. 4 a threaded bolt 34 is secure d to the center of the upper face of the electrode 31 and this bolt is screwed into the down-turned end 35 of the connection rod 33.

The electrode 31 acts as a locating member for a body of molten electrically conductive material 36 which clings to and is suspended form the lower surface of the electrode 31 and is confined between that surface and the upper face of the glass. This at least partly relieves the weight of the body of molten material 36 acting on the upper face of the advancing ribbon of glass and the clinging of the body of molten material to the electrode ensures the location of that body relative to the glass and prevents forward movement of the molten material with the glass.

Because the weight of the suspended molten material is relieved the method of the invention can be carried out near to the hot end of the bath as illustrated in FIGS. 1 and 2 where the temperature of the glass is for example in the range of 850° C. to 900° C. where the glass is in a plastic condition.

A second electrode 37 dips into the bath of molten metal alongside the path of travel of the glass and this electrode 37 is mounted on a connection rod 38 which extends through the sidewall 7 of the tank structure and is connected to the other terminal of the electric supply circuit.

The electrical connection to the supply circuit is in such a sense that the electrode 31 effectively acts as the anode of the electrolytic system comprising the locating electrode 31, the body of molten material 36, the glass 32 and the bath of molten metal 10. The passage of current through the glass causes controlled migration of an element from the confined molten material 36 into the top surface of the glass, thereby effecting a predetermined change in the surface characteristics of the glass as will be described below.

The electric current passing through the glass between the metal electrode 31 and the bath of molten metal is regulated in relation to the speed of advance of the ribbon of glass so that the migration and entry of an element into the surface of the ribbon of glass can be accurately controlled so controlling the intensity of the change in characteristic of the surface of the glass.

Many molten electrically conducting materials may be employed for affecting the method according to the invention and the nature of the electrically conductive material and of the element which enters the top face of the glass from that material is selected in accordance with the desired change to be induced in the surface characteristics of the glass.

The introduction of certain elements into the top face of the glass induces a tinting or change in color in a surface stratum of the glass. Other elements vary the electrical conductivity of the glass surface so as to produce a surface layer which is more electrically conductive than the rest of the glass and which can be employed as an electrical resistance heater embodied in the glass surface.

Equally important applications of the invention are to the manufacture of flat glass having a desired change in reflectivity of the surface of the glass. This has particular application in the manufacture of neutral tinted glass or heat and light attenuating glass for vehicle windscreens.

The molten electrically conductive material forming the elongated body 36 may be a metal or a metal alloy and the electrode 31 is preferably of a metal to which the molten metal or molten alloy clings.

A particularly efficacious "antiglare" glass is made by introducing lead electrolytically into the upper face of the ribbon of glass and then exposing the lead-rich surface to a reducing atmosphere during the continued travel of the treated ribbon along the bath of molten metal. This induces a grey coloration and increased reflectivity into the glass. Molten lead is used for the body of molten material 36 and the bar-shaped electrode 31 may be a platinum electrode or an electrode of ruthenium or of rhodium plated with platinum. Other metal which can be employed for the electrode with lead as the molten material are palladium, nickel and copper. An iron electrode has also been found to be advantageous particularly in the form of an iron bar coated with ruthenium to which the molten lead readily clings. Further the electrode may be of sintered iron to which the molten lead adheres.

The lead can be introduced between the electrode 31 and the glass in the form of minute pellets of lead which are fed into one edge of the body of molten lead.

Figure 5:
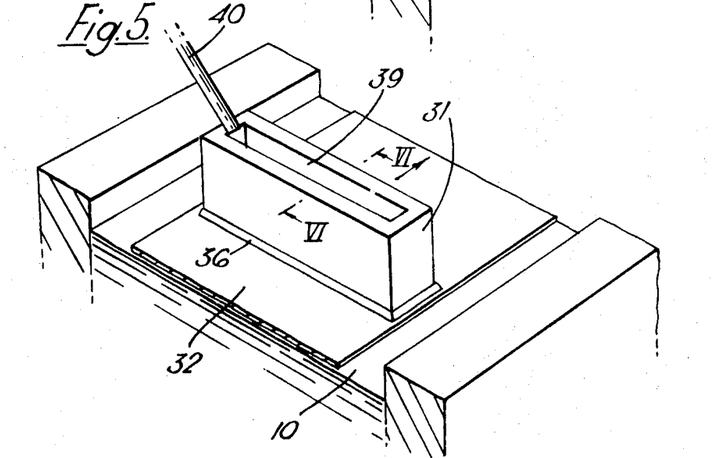
FIG. 5 is a perspective view of a modified form of electrode for use in the method of the invention.
Figure 6:
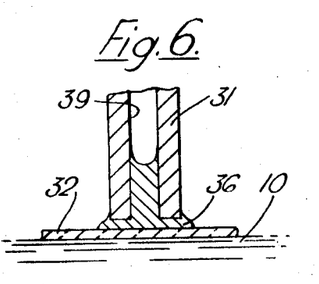
FIG. 6 is a sectional view on line VI—VI of FIG. 5.

Alternatively a construction of the electrode as illustrated in FIGS. 5 and 6 may be employed in which the electrode 31 has a hollow rectangular cross section. The internal space of the electrode 31 is indicated at 39 and holds by capillary action, which is greatly exaggerated, the pool of molten lead which spreads out beneath the sides of the electrode as illustrated in FIG. 6 although it is still clinging to the bottom of the electrode. The body of molten lead can be topped up by the feeding of pellets of lead through a tube 40 which directs these pellets over the sidewall of the electrode into the internal space. In this way the quantity of lead in the body is maintained to compensate for the continuous migration of lead into the upper surface of the glass.

Control of the current passing through the lead body into and through the glass, in relation to the rate of advance of the glass, controls the migration of lead into the upper face of the glass, and during the further advance of the ribbon of glass with the lead-rich surface towards the cooler outlet end of the bath the reducing action of hydrogen in the protective atmosphere in the headspace over the bath ensures that the lead which is actually set into the glass surface by the time the glass is sufficiently stiff to be taken unharmed from the bath, is in the form of minute particles of metallic lead. This as already described, develops a distinctive grey coloration in the glass with an increase in the reflective properties of the glass surface.

The metal of the electrode may be a metal which is unreactive and as well as the metals ruthenium, palladium and platinum mentioned above osmium, rhodium, iridium and rhenium may be employed. These metals can be employed with practically any molten metal or molten alloy forming the body 36 because they are very unreactive and even if some of the inert metal of the electrode is alloyed into the body of molten material it does not normally enter the glass surface from that body.

When relatively expensive metals are being employed for the locating member which have little solubility in the body of molten metal, they may be in the form of a coating on a suitable base metal or even on a refractory material. For example ruthenium may be plated onto a copper, brass or steel base, or even onto a graphite base. Alternatively ruthenium may be deposited onto a nickel base by vacuum evaporation. The electrode may be made of a composite material made from a refractory material such as alumina with a proportion of the desired metal such as ruthenium.

Other metals which may be used alone as the body of molten electrically conductive material 36 are tin, bismuth antimony, indium, zinc and thallium. Indium for example imparts a yellow coloration to the glass.

All these metals have a melting point below 1,000° C. so that they can be used over a considerable extent of the ribbon of glass advancing along the bath. When it is desired to introduce into the top face of the ribbon of glass a metal which is a highly chemically active metal, such as lithium sodium or potassium, or a metal whose melting point is higher than the temperatures normally met with in the manufacture of flat glass on the bath of molten metal or a metal with a high vapor pressure at bath temperatures, alloys of those metals are employed to constitute the body of molten material 36.

The solvent metal must dissolve sufficient of the solute metal to ensure that current is carried into the glass mainly by ions of the solute metal. Ideally the solvent metal is relatively inert.

Tin, bismuth or lead may be employed as the solvent metal of the alloy depending on the nature of the solute metal which is to be introduced into the glass.

For example the body 36 may be an alloy of tin with one of the following metals:—lithium, sodium, potassium, zinc, magnesium, aluminum silicon, titanium, manganese, chromium, iron and vanadium.

Bismuth is a particularly useful solvent metal and may be alloyed with any one of the metals:—lithium, sodium, zinc, magnesium, aluminum, silicon, titanium, manganese, cobalt, nickel, copper, silver, gold, antimony, indium and rhenium. Bismuth dissolves at least a small amount of many high melting point metals at the working temperatures of the bath of molten metal and is a relatively unreactive metal.

Lead can be used as the basis of an alloy with any one of the metals:—lithium, sodium, zinc, magnesium, aluminum, silicon, titanium, manganese, chromium, cobalt, nickel, copper, silver, antimony, indium and rhenium.

As mentioned above the material of the electrode to which the molten alloy 36 clings may be one of the metals of the platinum group or other inert metals but in other applications the metal which is used to constitute the electrode 31 may be the same metal as the solute metal of the alloy which is to be introduced into the upper surface of the glass.

For example the electrode bar 31 may be made of silicon, titanium, manganese, chromium, iron or vanadium, and the solute metal of a tin alloy clinging to the bar 31 is the same as the metal of the bar.

Similarly the bar 31 may be of silicon, titanium, manganese, cobalt, nickel, copper, silver, gold or rhenium, and the solute metal of a bismuth alloy clinging to the bar is the same as the metal of the bar.

In the same way when the solute metal of the lead alloy constituting the body 36 is silicon, titanium, manganese, chromium, cobalt, nickel, copper, silver or rhenium, the bar 31 is made of the selected one of those solute metals which is to migrate electrolytically into the glass surface.

If a copper/bismuth alloy is used for example the result is a red coloration in the glass surface which is developed by the effect of a reducing atmosphere acting on the surface of the glass. A silver/bismuth alloy introduces a yellow coloration and a nickel/bismuth alloy a grey coloration under reducing conditions.

As well as metal or metal alloys other molten electrically conductive materials may be employed for example molten salts and good results in modifying the glass surface characteristics have been achieved using molten halides of the elements silver, copper, zinc, sodium, potassium, lithium, chromium, manganese, cerium, cobalt, neodymium and praeseodymium.

Molten mixtures of salts may be used for example a mixture of silver chloride, sodium, chloride and potassium chloride.

An inert electrode, for example a graphite electrode, may be employed dipping into the molten salt to provide electrical connection to the salt. Advantageously the electrode is of the reactive metal which enters the glass from the salt, because with a consumable anode no gas is released into the bath atmosphere as a result of the electrolysis.

In this context chromium chloride when employed with an electrode of chromium metal produces a blue coloration in the glass.

Neodymium chloride with an electrode of solid neodynium produces a purple color. A green color can be produced using praeseodymium chloride with an electrode of solid praeseodynium. Other elements, e.g. manganese, may be introduced into the glass in the same way.

Not only can the invention be applied to glass in ribbon form which is being advanced along a bath of molten metal, but also the invention can be employed in the treatment of glass in sheet or ribbon form which is being advanced on a roller conveyor, and from this aspect the invention includes the maintaining of two dissimilar bodies of molten electrically conductive material against the glass surface. For example one body may be maintained against the upper face of the glass in the manner described above by clinging to an electrode mounted above the upper surface while the lower face of the glass may pass over an electrode of a second body of molten electrically conductive material which is clinging to an electrode mounted below the path of travel of the glass.

In the electrical process of the invention there is ionic migration from the face of the glass opposite to the face being modified, and it is in some circumstances necessary to maintain a circulation and purification of the molten cathode metal or salt.

Additionally a hot ribbon of glass advancing on a conveyor, for example in an annealing lehr, may have copper or silver introduced into one face of the glass.

Figure 7:
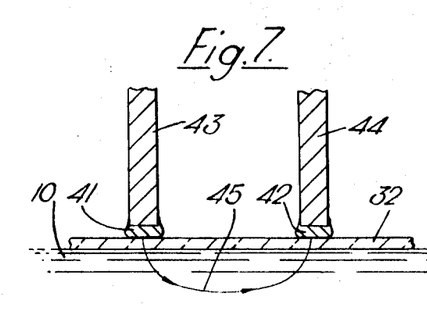
FIG. 7 is a view similar to FIG. 6 showing two bar-shaped electrodes mounted above the path of travel of the ribbon of glass.

Yet another way of operating the invention is illustrated in FIG. 7 in which two clinging bodies of molten electrically conductive material 41 and 42 are suspended from electrodes 43 and 44 against the upper surface of the advancing glass. The electrodes 43 and 44 are shown in FIG. 7 as being spaced apart along the surface of the glass by a distance sufficient to ensure passage of the electric current as indicated by the arrow 45 from the electrode 43, through the thickness of the glass beneath the electrode 43, then through the molten metal beneath the ribbon and up through the thickness of the glass beneath the electrode 44. The top face of the glass is modified by migration from the body 41, while the bottom face of the glass is modified beneath the electrode 44 by the bath metal.

The two electrodes 43 and 44 may be brought sufficiently close together, without the bodies of molten material 41 and 42 touching, to ensure that the current passes through the glass only and the top face only of the ribbon is treated by migration of an element from the pool 41 into that surface.

In FIG. 7 the glass is being advanced along a bath of molten metal but if the glass is at a temperature such that its under face would not be marred by the conveyor rollers then the glass may be supported on electrically insulating conveyor rollers as it is advanced beneath the two molten bodies 41 and 42. The current path is then only through the glass itself and only the top face of the glass is modified. The electrode 43 which is so connected as to act effectively as the anode may for example be a carbon or ruthenium bar from which a body of lead 41 is suspended while the contact electrode 44 is a nickel bar from which is suspended a body of molten tin touching the upper face of the glass.

Figure 8:
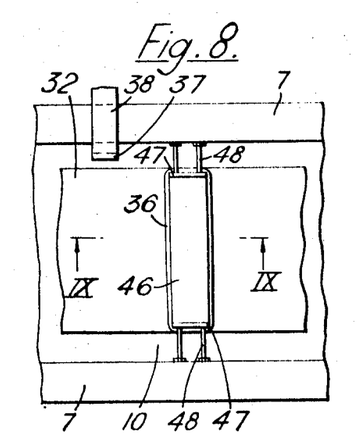
FIG. 8 is a plan view of a part of the tank structure showing a modification of the invention in which a strip of metal foil is employed to locate a body of molten material against the ribbon of glass.
Figure 9:
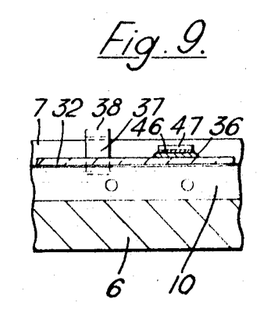
FIG. 9 is a section on line IX—IX of FIG. 8.

A further embodiment of the invention is illustrated in FIGS. 8 and 9 in which the electrically conductive locating member is a strip of metal foil 46 which is fixed to and stretched between two end bars 47 which are anchored to the sidewalls 7 of the tank structure by struts 48.

The struts 48 are fixed in the tank sidewalls in a position such that the faces of the foil 46 lie parallel to and just above the path of travel of the ribbon of glass, and the body of molten material 36 clings to the foil and is located thereby on the upper face of the advancing ribbon. The foil is for example 0.25 mm. thick and 5 cm. wide and if of a metal having a lower density than the molten electrically conductive material 36 which it locates, floats on the molten body 36. For example the foil may be of ruthenium-coated iron which floats on a body 36 of molten lead clinging to the foil.

Figure 3:
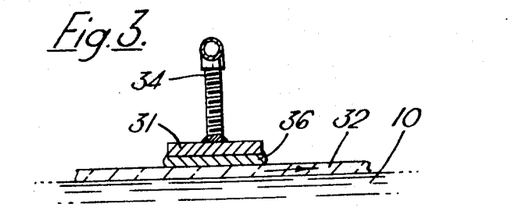
FIG. 3 is a sectional view of the line III—III of FIG. 2.
Figure 10:
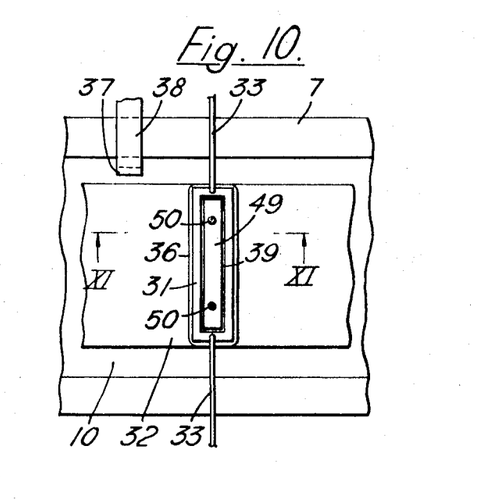
FIG. 10 is a view similar to FIG. 8, showing another form of electrode according to the invention.
Figure 11:
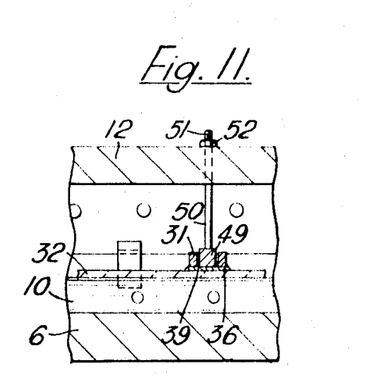
FIG. 11 is a section on line XI—XI of FIG. 10.

FIGS. 10 and 11 illustrate another embodiment of the invention in which the member locating the body 36 of molten material on the upper surface of the ribbon of glass 32 is in the form of a bar-shaped electrode 31 with a central aperture 39 similar to the electrode shown in FIG. 5. The electrode 31 is held in position by connection rods 33 which extend into the headspace over the bath through the sidewalls of the tank structure. Bolts, not shown but similar to the bolts 34 of FIG. 3 and 4 are fixed to the ends of the electrode 31 and the downturned ends of the connecting rods 33 are secured to these bolts. As well as supporting the electrode 31, electrical connection is made to the electrode through the rods 33.

A body 36 of molten material clings to the electrode 31 and is located by the electrode against the upper face of the ribbon of glass. In one example of operating the construction of FIG. 10 and 11 the electrode 31 is of ruthenium, and the body of molten material 36 is a copper/bismuth alloy from which copper is introduced electrolytically into the top face of the glass. A bar of a metal to be introduced into the glass, which is copper in this example, is fitted into the aperture 39 in the electrode 31 and is held suspended in that aperture by hanger rods 50 which pass upwardly through the roof structure 12 and are threaded at their upper ends 51. Nuts 52 are threaded on to the upper ends of the rods 50 which project above the roof structure and the nuts bear on the outside of the roof thereby locating the bar 49 vertically relative to the electrode 31 which is in effect a frame around the bar.

The supply of current through the frame electrode 31 causes migration of copper from the alloy into the glass surface, and the concentration level of copper in the alloy clinging to the electrode 31 is maintained by the copper slowly dissolving from the bar 49 into the alloy. The bar 49 can be lowered from time to time as it dissolves by adjustment of the nuts 52 so as to maintain the bottom of the bar 49 dipping into the molten body 36.

Figure 12:
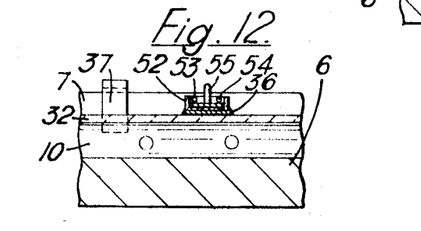
FIG. 12 is a vertical section through an electrode particularly for use in maintaining a body of a molten salt against the upper face of the glass.

An electrode construction for use when working with a body of molten salt is illustrated in FIG. 12. The electrode takes the form of an elongated rectangular receptacle 52 of a porous refractory material, e.g. alumina, and is supported above the path of travel of the ribbon of glass by struts 53 which fix the ends of the receptacle 52 to the sidewalls 7 of the tank structure in the same manner as the struts 48 shown in FIG. 8. A quantity of the molten salt 54 is held in the hollow receptacle and the molten salt percolates through the porous refractory to maintain a constant quantity of salt underlying the receptacle 52 which salt constitutes the body 36.

An electrical connection 55, which is the downturned end of a connection rod 33, dips into the molten salt 54.

Sheets of glass which are being guided along a bath of molten metal by driven fingers engaging the edges of the sheets, or which are being advanced on a roller conveyor can be treated by the method of the invention. Articles of pressed ware e.g. hollow glass blocks, television tube face plates and electrical insulators can also be treated by conveying the articles after forming and while they are still hot to a molten bath on which they are floated while a body of molten material clinging to a locating member is lowered into the hollow in the article so as to bear against the interior surface of the formed article. By suitably shaping the locating member surface characteristics may be imparted to the glass article in any desired pattern or design. Static treatment of a hot glass article may be effected by contacting both the interior and exterior faces of the article with bodies of molten electrically conductive material which are clinging to locating members.

Rolled glass can acquire desired surface characteristics by the method of the invention while the glass is still hot and is advancing on a roller conveyor. Rolled patterned glass, wired glass and rolled glass sections for use as building construction elements can be treated in this way.

The invention is also applicable to the production of flat glass by vertically drawing glass in continuous sheet form from a pool of molten glass. At a level where the sheet glass is still sufficiently hot to be electrically conductive two bodies of molten electrically conductive material clinging to respective locating members are held against opposite faces of the sheet and electric current is passed through the sheet between the bodies to cause the desired migration into the glass surface.

The glass being treated may be moved relative to the locating member with its clinging body of molten electrically conductive material as illustrated herein. By supporting the locating member in suitable electrically insulated conveying mechanism it may be moved, with its clinging molten body, relative to the glass either in sheet or ribbon form and the invention also comprehends this manner of modifying the glass surface, as well as the stationary treatment of glass articles.

The invention thus provides an improved and effective way of treating glass to modify the constitution of the surface of the glass for example, in respect of color, reflectivity or electrical conductivity without in any way having to alter the glass batch material. The characteristics of the glass produced, be it flat glass or shaped glass articles, can be readily changed by employing the method of the invention while maintaining a continuous output of a basic glass from the glass-melting furnace.

The invention provides improved versatility in the manufacture of float glass having desired characteristics to meet different commercial needs, because the electrical treatment can be carried out anywhere along the bath of molten metal. The fact that the body of electrically conductive material extending across the ribbon of glass is clinging to an electrode above the surface of the ribbon of glass means that even if the treatment is effected near to the hot end of the bath as illustrated in FIGS. 1 and 2, there is no deleterious effect on the surface quality of the glass produced.

We claim:

1. A method of producing glass having predetermined characteristics, comprising regulating the temperature of the glass so that it is electrically conductive, maintaining between the glass and a locating member adjacent to but spaced from the glass a body of molten electrically conductive material which clings to the locating member, the extent of said body in the direction of advance of the glass being substantially codimensional with that of the locating member, passing electric current between the molten body of electrically conductive material and the glass and regulating the electric current to cause controlled migration of an element from said molten material into the surface of the glass, thereby effecting a predetermined change in the characteristics of the glass.

2. A method according to claim 1, wherein an elongated body of said molten electrically conductive material is maintained against a face of a ribbon of glass advancing along a bath of molten metal by causing that elongated body to cling to a locating member extending transversely of the advancing ribbon of glass.

3. A method according to claim 1, characterized by continuously introducing said element into the body of molten electrically conductive material, and controlling the introduction of said element in relation to the rate of advance of the glass and the strength of the electric current so as to maintain a desired concentration of said element in the body of molten material.

4. A method according to claim 1, wherein the molten electrically conductive material is a molten metal or a molten alloy.

5. A method according to claim 1, wherein the body of molten material clings to a metal-locating member through which electrical connection is made to the molten material.

6. A method according to claim 5, wherein the metal of the locating member is a member of the group consisting of osmium, palladium, platinum, rhodium, ruthenium, iridium and rhenium.

7. A method according to claim 4, wherein the molten alloy comprises at least two metals which are to enter the glass, and the temperature of the alloy and the electric current are selectively regulated to cause migration of said two metals into the glass in a proportion to produce desired characteristics in the glass.

8. A method according to claim 7, wherein the molten body is a molten alloy and the locating member comprises one of the metals of the alloy, which metal migrates into the glass.

9. A method according to claim 1, comprising continuously forming a ribbon of glass and advancing the ribbon at a controlled rate, maintaining two bodies of molten electrically conductive material against the glass surface by causing the molten bodies to cling to locating members adjacent the glass, and passing a controlled electric current through the glass between said bodies thereby modifying the constitution of the glass.

10. A method according to claim 9, wherein the bodies of molten electrically conductive material are held against opposite faces of the ribbon so that the electric current flows through the thickness of the glass.

11. A method according to claim 1, of producing a glass article having predetermined characteristics other than the natural characteristics inherent in the method of forming the article, characterized in that when the article is sufficiently hot to be electrically conductive, a body of a molten electrically conductive material clinging to a locating member is held against one face of the article, said body containing an element capable of producing the desired characteristic when incorporated in the article, an electric current is passed through the article between said body and an electrically conductive body contacting the other face of the article to cause migration of said element into the article, and said electric current is regulated whereby the concentration of said element incorporated in the article is adjusted to produce the desired characteristic.

12. Apparatus for use in the production of float glass, comprising a tank structure containing a bath of molten metal, a roof structure defining a headspace over the bath, means for maintaining a plenum of protective atmosphere in the headspace, means for delivering glass at a controlled rate to the bath and for advancing the glass along the bath as a layer of molten glass in ribbon form, an elongated, bar-shaped metal electrode mounted across the tank structure transversely and just above the path of travel of the glass so as to be adjacent one face of the glass, means for maintaining a body of molten electrically conductive material clinging by surface tension forces to said electrode and suspended therefrom against said one face of the glass, an electrical connection to the bath of molten metal, and a regulatable current supply circuit connected to the metal electrode and, through said electrical connection, to the molten metal bath, to engender current flow between the body of molten material and the glass.

13. Apparatus according to claim 12, wherein the bar-shaped electrode is made from a metal which is a member of the group consisting of platinum, palladium, ruthenium, rhodium, osmium, iridium and rhenium.

14. Apparatus according to claim 12, wherein the bar-shaped electrode is made from a metal which is a member of the group consisting of silicon, titanium, manganese, chromium, iron, vanadium, cobalt, nickel, copper, silver and gold.

15. Apparatus according to claim 12, wherein the electrode is formed with an aperture extending downwardly through the electrode, a bar of a metal to be introduced into the glass is fitted into the aperture and is connected to means for gradually lowering the bar through the aperture so that it maintains the concentration of that metal in the body of molten electrically conductive material clinging to the electrode.

16. Apparatus for use in the production of float glass, comprising a tank structure containing a bath of molten metal, a roof structure defining a headspace over the bath, means for maintaining a plenum of protective atmosphere in the headspace, means for delivering glass at a controlled rate to the bath and for advancing the glass along the bath as a layer of molten glass in ribbon form, a strip of metal foil anchored at its ends to opposite sides of the tank structure so that the foil is held transversely and just above the path of travel of the glass and is adjacent one face of the glass, means for maintaining a body of molten electrically conductive material clinging by surface tension forces to said foil and suspended therefrom against said one face of the glass; an electrical connection to the bath of molten metal, and a regulatable current supply circuit connected to said foil and, through said electrical connection, to the molten metal bath, to engender current flow between the body of molten material and the glass.

17. Apparatus for use in the production of float glass, comprising a support for the glass constituted by a bath of molten metal, heaters associated with the bath for controlling the electrical conductivity of the glass, an elongated receptacle of porous refractory material mounted transversely of and just above the path of travel of the glass along the bath so as to be adjacent one face of the glass, means for maintaining a quantity of molten salt in said receptacle, which molten salt percolates through the receptacle to replenish a body of molten salt clinging to the bottom of the container and suspended therefrom against said one face of the glass, an electrical connection to said bath, an electrical connection to said body of molten salt, and a regulatable current supply circuit connected to said electrical connections to engender current flow between said body of molten salt and the glass.